Figure 1:
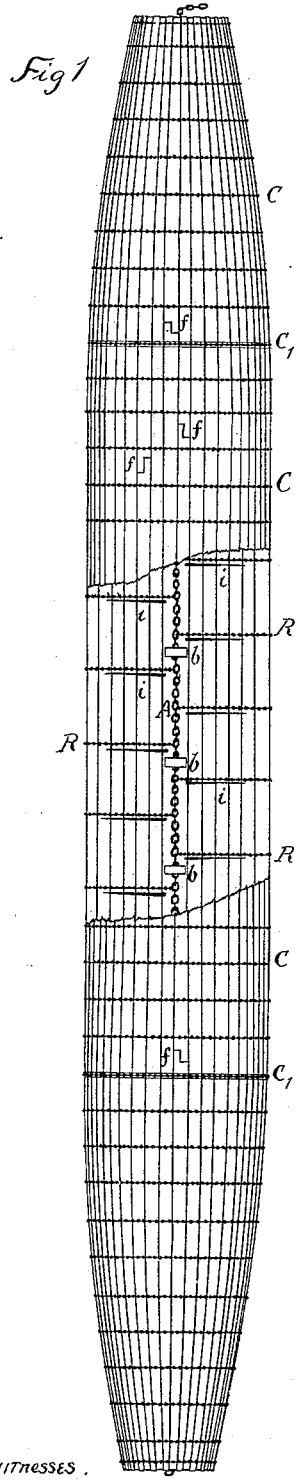

(No Model.) 2 Sheets—Sheet 1.

H. R. ROBERTSON.
LOG RAFT.

No. 392,691. Patented Nov. 13, 1888.

WITNESSES
H. J. A. Goward
I. Russell Armstrong

INVENTOR:
Hugh R. Robertson.
by J. J. Armstrong
Atty.

(No Model.) 2 Sheets—Sheet 2.
H. R. ROBERTSON.
LOG RAFT.
No. 392,691. Patented Nov. 13, 1888.
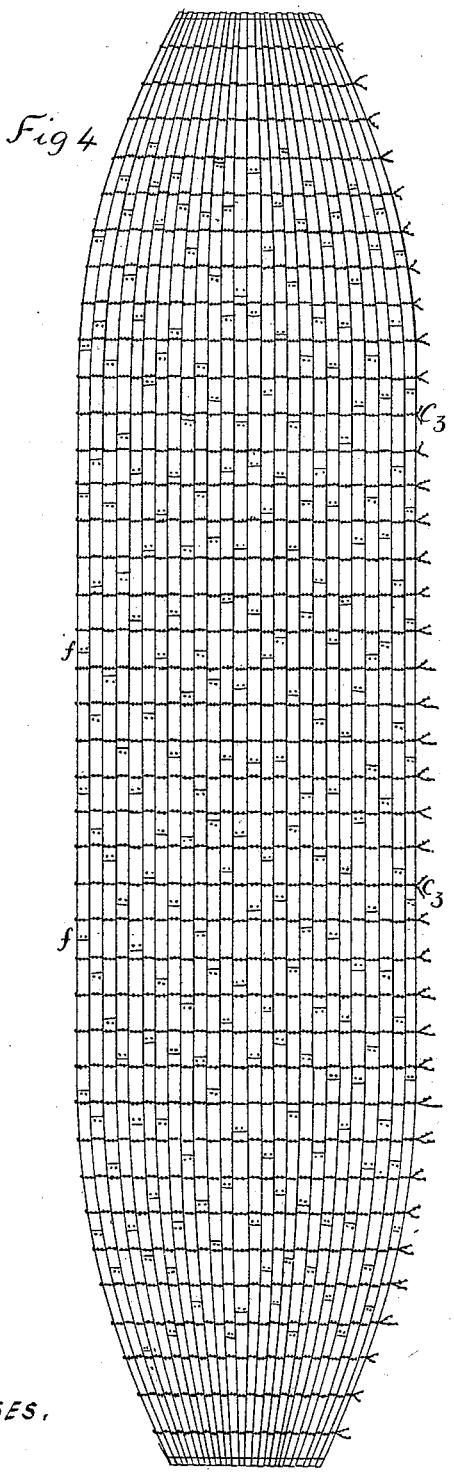
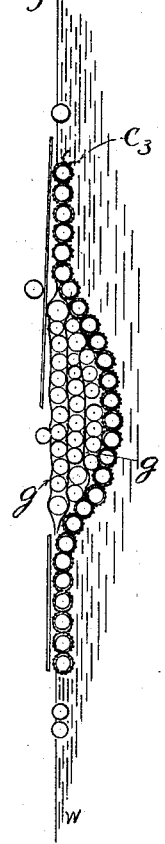

UNITED STATES PATENT OFFICE.

HUGH R. ROBERTSON, OF ST. JOHN, NEW BRUNSWICK, CANADA.

LOG-RAFT.

SPECIFICATION forming part of Letters Patent No. 392,691, dated November 13, 1888.

Application filed April 24, 1886. Serial No. 200,007. (No model.) Patented in Canada January 7, 1886, No. 23,095.

*To all whom it may concern:*

Be it known that I, HUGH RODERIC ROBERTSON, a citizen of the United States, residing at the city of St. John, in the county of St. John and Province of New Brunswick, and Dominion of Canada, have invented certain new and useful Improvements in the Mode of Rafting Logs, Timber, and other Lumber for Deep-Water Towage, being improvements on a former invention made by me and patented March 16, 1886, No. 338,104, (for which, among other claims, I have received a patent in the Dominion of Canada, dated January 7, 1886, and numbered 23,095,) of which the following is a specification.

The object of my invention is to add to the security of the raft and vary the means of attaining the desired end—namely, to make a raft that can be towed comparatively easy and be strong enough to resist the action of the ocean waves. This I accomplish by laying up the logs and other pieces of timber (both in the cross-section and in the length of the raft) lengthwise into a cylindrical or cigar-shaped structure, the logs and other pieces of timber breaking joint with each other continually, as described in my former patent; and in addition I scarf the ends of the outer pieces or skin tier, where they abut one on another, and secure them together with heavy treenails or other fastening; and I lay withes or brush across and in various directions between the pieces of timber forming the raft, and which, being interlaced and crushed down, will further bind the whole together. I also scribe or cut notches in the exposed sides of the outer pieces in lines encircling the raft at frequent intervals, and in these lay the encircling chains, so that they may not readily catch against anything while launching or afterward.

To make this specification complete I describe my mode of rafting including my improvements.

The cradle or forms on which the raft may be constructed may be a temporary timber structure or structures having cross-pieces properly supported and other pieces built on so as to give the desired rounded shape to the bottom. These cross-frames give frequent points of support while building and handling prior to towing away to destination, and are set in the desired lines along, on the beach or bank or or on the ice, or in the water, (over launch-ways or not, as the case may require,) from which the raft can be launched or floated into open water and towed wherever required, to be there broken up and the pieces sorted out for their different destinations and uses. In making the raft with central longitudinal encircling and radial chains, I prefer that a single radial chain should run out horizontally to each encircling chain alternately from either side; and at intervals along the central chain I set short cross-blockings having a hole through the center for the longitudinal chain to play through, and which may be formed of two pieces set one over the other and notched out in the center to form the hole. These are set centrally between any two points of attachment of the radial chains, and they are of such a size and so spaced that they will keep the logs, &c., from pressing on and binding the longitudinal chain; and I also lay poles of suitable size from the central space, so formed, running out beside the radial chains to within a short distance of the side of the raft, so that the radial chains may also have a certain amount of play. The object of these two latter items is to make the combination of chains act as a sort of spring, for though usually all the chains will be drawn tight and fastened before the raft is launched or floated away, yet when in the water the tendency of the bottom logs will be to rise and the top ones to sink, thus spreading the raft sidewise, and as this takes place the central chain will be drawn slightly into a zigzag line by the alternate side strain of the radial chains; but as the central chain is fastened at the ends of the raft this can only take place within moderate limits, and will tend to equalize the strains throughout the raft. I propose to use double chains or cables at like intervals to the encircling chains, (and which they may replace in part or in whole,) weaving them about the outer logs, which may or may not be grooved to receive them; or the encircling chains may be passed through holes bored in the outer logs, or be attached to each outer log where they cross. And in the case of a raft constructed in the water, I prefer to operate as follows: I scarf the ends of a large number of the logs intended for the outside of the raft and couple them together into lines corresponding with the desired length of the raft, arranging the butts and joints so that the lines can be drawn close together, and tapering them in size toward the ends for the purpose hereinafter described. I then at frequent intervals weave in the double chains by folding them in the center and passing the ends around the first line of logs. Then the upper ends are thrown over the next line and the under ends drawn up round the same, these in turn becoming the upper ends, which are thrown over the next line of logs and the under ones brought up, and so on until all the lines have been woven into a mat, which would be made of sufficient width to encircle more than half the raft when filled up and drawn into shape, and the tapering lines of logs would form a tapering mat so as to allow for the taper in the raft at the ends; or the mat may be made by passing the single chains through holes in the lines of logs or by attaching the chains to each log at its crossing. I then proceed to pile on the logs, lumber, &c., along the center of the mat, laying in brush crosswise to keep them from working sidewise during construction, and regulating the sinkage by using more or less pliable brush. Thus I continue forming the rounded bottom until the half-raft is completed, when I lay in the longitudinal and radial chains, attaching the latter to the weaving or cross chains of the mat, and these chains of the mat may be encircling chains, or other additional encircling chains may be added on completion. I then complete the raft, as before described. The mat will usually envelop at least the whole submerged portion.

Figure 3:
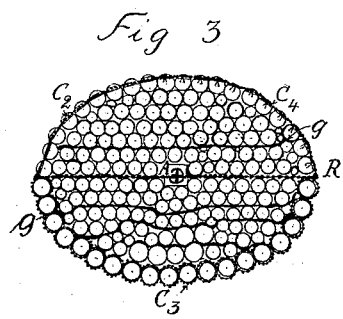
Figure 2:
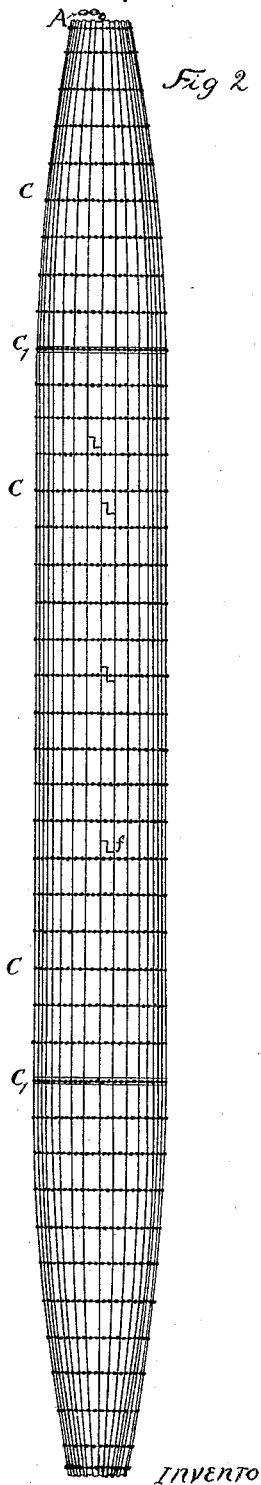

Figure 1 shows the raft in plan, showing the encircling chains C C, the grooves being indicated by the extra lines at C C, the scarf-joints of the outside pieces being shown at $f$ $f$. It shows, also, a horizontal cross-section at center, showing the cross-blocks $b$ $b$ and the poles $i$ $i$ to give the chains play; Fig. 2, a side view. Fig. 3 is a cross-section showing the central chain, A, and the radial chains R R, described in the said former invention, with the double encircling chains woven in with the outside logs, as at $c^2$, and the encircling chains passing through holes in the outer logs, as at $c^3$, and the encircling chains lying in grooves in and attached to the outer logs at each crossing, as at $c^4$. The withes are indicated by the lines $g$ $g$, crushed down between the pieces. Fig. 4 shows the mat coating or skin of logs spread out as on the water, the logs shown coupled together into lines by scarfs and bound together crosswise by chains or cables $c^5$. Fig. 5 shows a cross-section of the mat with the filling of the raft commenced at the center and with the brush shown at $g$ $g$ in the water W, the drawing being turned sidewise.

I do not claim herein the combination of a structure or raft composed of a large number of logs or pieces of timber or lumber (both in cross-section and in the length) forming a continuous bundle of (practically) parallel pieces in which the jointing is thoroughly broken, and of a cylindrical or approximately cylindrical form, with girths or encircling chains or cables set at frequent intervals in its length, nor the combination therewith of longitudinal or radial chains; nor do I claim a collapsible grillage or crib for towing lumber on or in, nor a grillage with movable stanchions for that purpose; but, Having fully described my invention, what I claim as new, and desire to protect by Letters Patent, is—

1. In a structure or raft composed of a large number of logs or pieces of timber or lumber (both in cross-section and in the length) forming a continuous bundle of (practically) parallel pieces in which the jointing is thoroughly broken, and of a cylindrical or approximately cylindrical form, with girths or encircling chains set at frequent intervals in its length, the combination therewith of the ends of the outer pieces, when they abut one on another, halved or scarfed together and fastened with treenails or other fastenings, as and for the purpose described.

2. In a structure or raft composed of a large number of logs or pieces of timber or lumber (both in cross-section and in the length) forming a continuous bundle of (practically) parallel pieces in which the jointing is thoroughly broken and of a cylindrical or approximately cylindrical form with girths or encircling chains set at frequent intervals in its length, the combination therewith of grooves scribed or cut into the outer pieces of the raft at frequent intervals in the length for the encircling chains or cables to lie in, as and for the purpose described.

3. In a structure or raft composed of a large number of logs or pieces of timber or lumber (both in cross-section and in the length) forming a continuous bundle of (practically) parallel pieces in which the jointing is thoroughly broken and of a cylindrical or approximately cylindrical form with girths or encircling chains set at frequent intervals in its length, the combination therewith of withes or brush lying across and interlaced among the pieces forming the raft in various directions, all as and for the purpose described.

4. In a structure or raft composed of a large number of logs or pieces of timber or lumber (both in cross-section and in the length) forming a continuous bundle of (practically) parallel pieces in which the jointing is thoroughly broken and of a cylindrical or approximately cylindrical form with girths or encircling chains set at frequent intervals in its length, the combination therewith of chains or cables worked in with the outer logs at frequent intervals in the length of the raft, so as to combine them into a mat or skin encircling the lower part of the raft, as and for the purpose described.

5. In a structure or raft composed of a large number of logs or pieces of timber or lumber (both in the cross-section and in the length) forming a continuous bundle of (practically) parallel pieces in which the jointing is thoroughly broken and of a cylindrical or approximately cylindrical form with girths or encircling chains set at frequent intervals in its length, the combination therewith of a mat, coating, or skin, embracing the lower part of the raft formed of lines of logs scarfed together and bound together by chains or cables across the said lines of logs at frequent intervals in the length, as and for the purpose described.

HUGH R. ROBERTSON.

Witnesses:
J. S. ARMSTRONG,
W. B. ALLAN.